(12) United States Patent
Sasaki

(10) Patent No.: US 11,170,250 B2
(45) Date of Patent: Nov. 9, 2021

(54) NAIL CONTOUR DETECTING DEVICE, NAIL CONTOUR DETECTING METHOD AND STORAGE MEDIUM

(71) Applicant: CASIO COMPUTER CO., LTD., Tokyo (JP)

(72) Inventor: Masaaki Sasaki, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 495 days.

(21) Appl. No.: 16/136,176

(22) Filed: Sep. 19, 2018

(65) Prior Publication Data

US 2019/0095747 A1 Mar. 28, 2019

(30) Foreign Application Priority Data

Sep. 27, 2017 (JP) .............................. JP2017-185568

(51) Int. Cl.
| | |
|---|---|
| *G06K 9/46* | (2006.01) |
| *A45D 29/14* | (2006.01) |
| *G06T 7/136* | (2017.01) |
| *G06T 7/73* | (2017.01) |
| *G06T 7/181* | (2017.01) |
| *G06T 7/13* | (2017.01) |
| *A45D 29/00* | (2006.01) |
| *G06T 7/62* | (2017.01) |
| *G06T 7/174* | (2017.01) |

(52) U.S. Cl.
CPC .......... *G06K 9/4604* (2013.01); *A45D 29/00* (2013.01); *A45D 29/14* (2013.01); *G06T 7/13* (2017.01); *G06T 7/136* (2017.01); *G06T 7/181* (2017.01); *G06T 7/74* (2017.01); *G06T 7/174* (2017.01); *G06T 7/62* (2017.01)

(58) Field of Classification Search
None
See application file for complete search history.

(56) References Cited

U.S. PATENT DOCUMENTS

| | | | |
|---|---|---|---|
| 9,357,825 B2 | 6/2016 | Yamasaki | |
| 2011/0158542 A1* | 6/2011 | Kato | ........................ G06K 9/03 |
| | | | 382/195 |
| 2015/0007841 A1* | 1/2015 | Yamasaki | .............. A45D 29/00 |
| | | | 132/73.5 |

FOREIGN PATENT DOCUMENTS

JP 2015013002 A 1/2015

OTHER PUBLICATIONS

Xudong Cao, et al., "Face alignment by Explicit Shape Regression," International Journal of Comput. Vis., Dec. 13, 2013, CVPR 2012, pp. 2887-2894.
Japanese Office Action (and English language translation thereof) dated Sep. 7, 2021 issued in Japanese Application No. 2017-185568.

\* cited by examiner

*Primary Examiner* — David Perlman
(74) *Attorney, Agent, or Firm* — Holtz, Holtz & Volek PC

(57) ABSTRACT

A nail contour detecting device including a processor, wherein the processor obtains first feature point data of a first nail contour which is a nail contour detected from a first nail image obtained by imaging a nail of a finger or a toe, and second feature point data of a second nail contour which is a nail contour detected from a second nail image obtained by imaging a nail of the same finger or toe as the first nail image; and the processor obtains one nail contour based on the first feature point data and the second feature point data.

14 Claims, 9 Drawing Sheets

| FEATURE POINT | RELIABILITY OF EACH FEATURE POINT (TD) |
|---|---|
| D1 | TD1=250 |
| D2 | TD2=230 |
| D3 | TD3=245 |
| D4 | TD4=250 |
| D5 | TD5=250 |
| D6 | TD6=230 |
| D7 | TD7=250 |
| D8 | TD8=100 |
| D9 | TD9=105 |
| D10 | TD10=250 |
| D11 | TD11=250 |
| D12 | TD12=240 |
| D13 | TD13=230 |
| D14 | TD14=200 |
| D15 | TD15=120 |
| D16 | TD16=240 |
| D17 | TD17=230 |
| D18 | TD18=220 |
| D19 | TD19=240 |

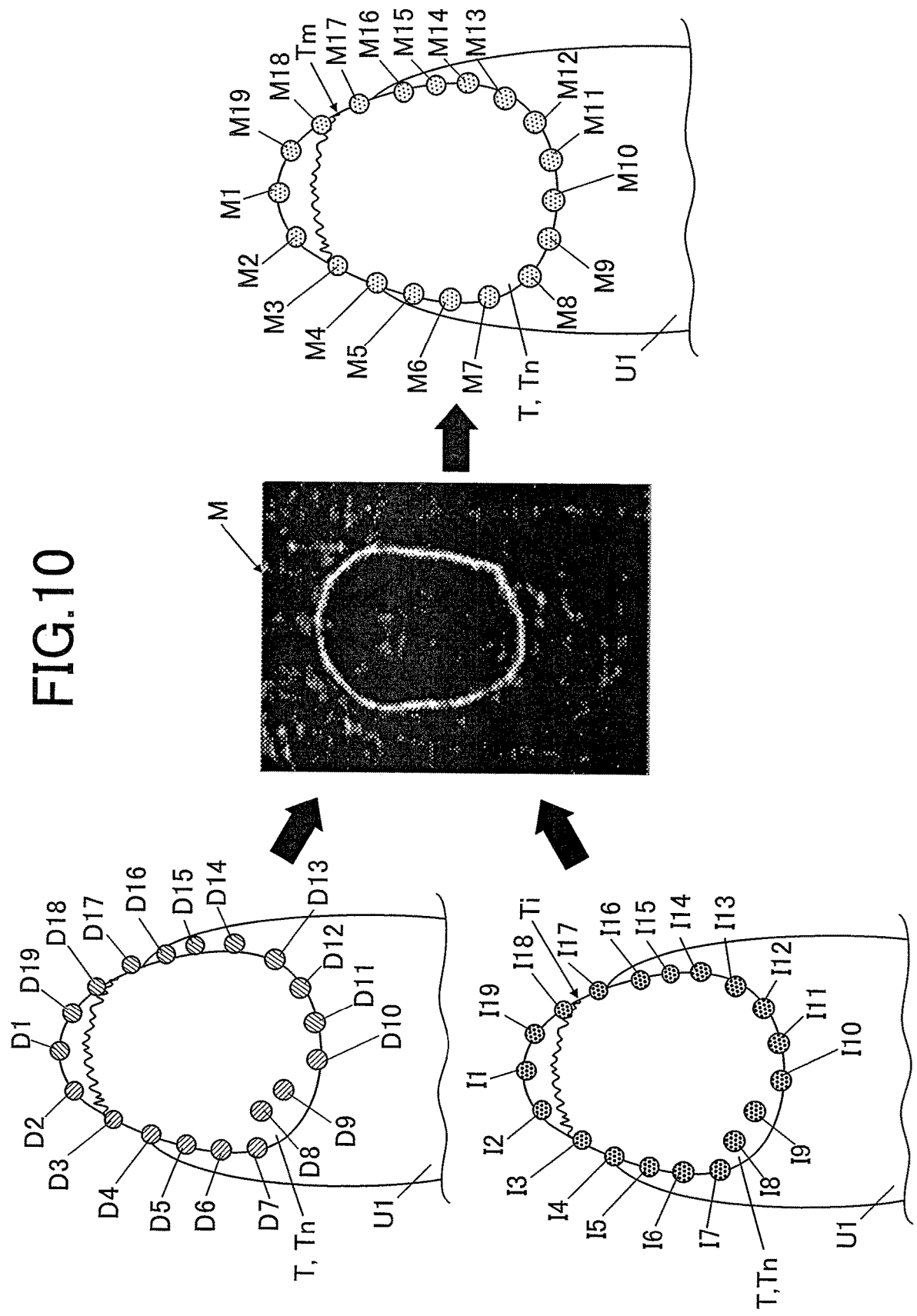

NAIL CONTOUR DETECTING DEVICE, NAIL CONTOUR DETECTING METHOD AND STORAGE MEDIUM

CROSS-REFERENCE TO RELATED APPLICATIONS

This application is based upon and claims the benefit of priority under 35 USC 119 of Japanese Patent Application No. 2017-185568 filed on Sep. 27, 2017 the entire disclosure of which, including the description, claims, drawings, and abstract, is incorporated herein by reference in its entirety.

BACKGROUND OF THE INVENTION

1. Field of the Invention

The present invention relates to a nail contour detecting device, a nail contour detecting method and a storage medium.

2. Description of Related Art

Traditionally, there is known a method for detecting the contour of an object (detection object) in an image of the object, which is obtained by imaging the object, through image processing.

By using such technique, for example, in the case where a person is photographed and a photographic image is obtained, the contour of the face of the person and the contours of individual parts such as eyes, nose, mouth and the like can be detected from the feature parts such as eyes, nose, mouth and the like that are included in the photographic image.

Further, for example, in the case where some kind of treatment is automatically carried out on a nail such as in a drawing device which carries out nail printing on the surface of a nail, the contour of the nail, which is the target of the treatment, needs to be cut out accurately as premises.

It can be considered to also use the above mentioned contour detection technique in the above case.

As for a contour detection technique, for example, method in which learning data is compiled by collecting a plurality of sample images and the contour is detected through machine learning by using the learning data can be considered. For example, "Face alignment by Explicit Shape Regression" (Xudong Cao, Yichen Wei, Fang Wen and Jian Sun, CVPR 2012:2887-2894) discloses a technique for detecting the contour of the detection target by an algorithm called ESR.

In the case where the contour detection is carried out by machine learning, the contour of the object such as a nail or the like to which various types of treatments such as nail printing and the like are to be carried out thereafter can be cut out in an image without troubling the user.

The present invention has the advantage of offering a nail contour detecting device, a nail contour detecting method and a storage medium which can provide more reliable nail contour.

According to an embodiment of the present invention, there is provided a nail contour detecting device including a processor, wherein the processor obtains first feature point data of a first nail contour which is a nail contour detected from a first nail image obtained by imaging a nail of a finger or a toe, and second feature point data of a second nail contour which is a nail contour detected from a second nail image obtained by imaging a nail of the same finger or toe as the first nail image; and the processor obtains one nail contour based on the first feature point data and the second feature point data. There is provided a nail contour detecting method, including: obtaining a first nail image imaging a nail; obtaining a second nail image imaging a nail of a same finger or toe as the first nail image; obtaining first feature point data of a first nail contour which is a nail contour detected from the first nail image imaging the nail of a finger or a toe, and second feature point data of a second nail contour which is a nail contour detected from the second nail image obtained by imaging the nail of the same finger or toe as the first nail image; and obtaining one nail contour based on the first feature point data and the second feature point data. There is provided a non-transitory readable storage medium storing a program which makes a computer of a nail contour detecting device realize functions of: obtaining a first nail image imaging a nail; obtaining a second nail image imaging a nail of a same finger or toe as the first nail image; obtaining first feature point data of a first nail contour which is a nail contour detected from the first nail image imaging the nail of a finger or a toe, and second feature point data of a second nail contour which is a nail contour detected from the second nail image obtained by imaging the nail of the same finger or toe as the first nail image; and obtaining one nail contour based on the first feature point data and the second feature point data.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 10 is an explanatory diagram which schematically shows the merging process according to the embodiment.

DETAILED DESCRIPTION OF THE PREFERRED EMBODIMENT

Figure 1:
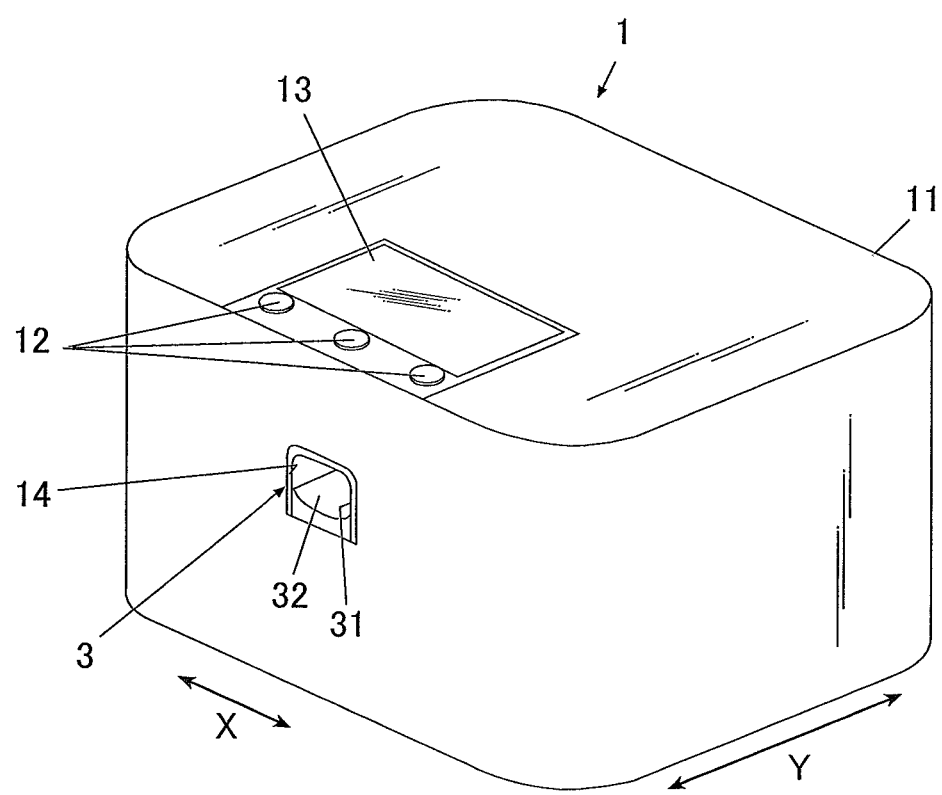
FIG. 1 is a schematic view showing an outer structure of a nail contour detecting device according town embodiment.

With reference to FIGS. 1 to 10, an embodiment of the nail contour detecting device according to the present invention will be described.

Hereinafter, although various limitations which are technically preferred to execute the present invention are adopted, the scope of the present invention is not limited to the following embodiments and the examples shown in the drawings.

FIG. 1 is a schematic view showing the outer view of the nail contour detecting device according to an embodiment.

As shown in FIG. 1, the nail contour detecting device 1 according to the embodiment includes a case 11 formed in an approximate box shape.

The operating unit 12 is set on the upper surface (top board) of the case 11.

The operating unit 12 is an input unit where a user carries out various types of inputs.

The operating unit 12 includes operating buttons for carrying out various types of inputs such as a power switch button for turning the power of the nail contour detecting device 1 on, a stop switch button for stopping the operation, a detection start button for giving an instruction to start the contour detection of a nail T and the like.

Further, the display 13 is set on the upper surface (top board) of the case 11.

The display 13 is formed of a liquid crystal display (LCD), an organic electroluminessence display, other flat display or the like, for example.

In the embodiment, for example, a nail image (a finger image including the image of the nail T) which is obtained by imaging a finger U1, an image of a contour line or the like of the nail T which is included in the nail image, instruction screen and the like which shows various types of instructions are to be displayed in the display 13 as needed.

Here, a touch panel for carrying out various types of input may be integrally included in the surface of the display 13. In such case, the touch panel functions as the operating unit 12.

Furthermore, an opening 14 for inserting and setting the finger U1 at the imaging position where imaging can be carried out by the imaging unit 50 at the time when imaging is to be carried out by the nail contour detecting device 1 is formed in the front surface side (the near front side in FIG. 1) of the case 11, the finger U1 corresponding with the nail T which is the detection target.

The finger fixation unit 3 which fixates the nail T (the finger U1 including the nail T) which is the detection target in the embodiment is disposed inside the opening 14.

Figure 2:
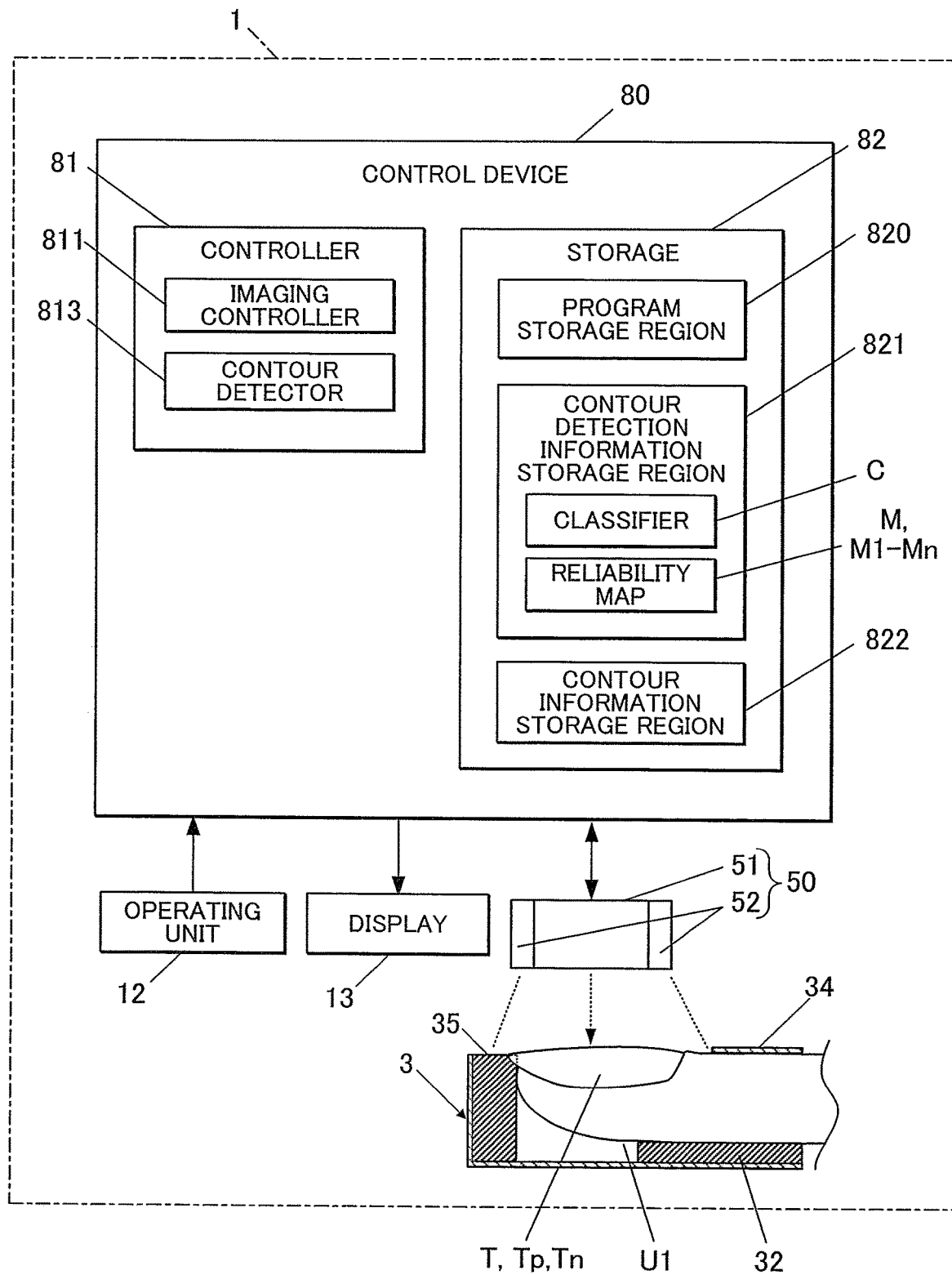
FIG. 2 is a configuration diagram of a main part showing a functional configuration of the nail contour detecting device according to the embodiment.

FIG. 2 is an explanatory diagram in which the main configuration of the nail contour detecting device according to the embodiment is shown in a functional manner.

As shown in FIG. 2, the finger fixation unit 3 is a box-shaped member including an opening 31 in the near front side of the device, and the finger fixating member 32 for fixating the finger U1 is disposed inside the finger fixation unit 3.

The finger fixating member 32 is for supporting the finger U1 while pushing the finger U1 upward from below and for example, it is formed of a resin or the like having flexibility.

The back part of the upper surface of the finger fixation unit 3 is opened, and the nail T of the finger U1 which is inserted in the finger fixation unit 3 is to be exposed from this opened part.

Moreover, the front side part of the upper surface of the finger fixation unit 3 is the finger holder 34 which controls the position of the finger U1 in the upper direction by preventing the finger U1 from rising upward. The height positions of the finger U1 and the nail T thereof are positioned at predetermined positions by the finger U1 being supported by the finger fixating member 32 from below and the upper side of the finger U1 being held down by the finger holder 34.

Further, in the embodiment, the nail placing unit 35 on which the nail T is to be placed is formed in the back in the finger inserting direction.

By placing the tip of the nail T on the nail placing unit 35, the position of the nail T in the horizontal direction (that is, in the X direction and in the Y direction) is decided and the position of the nail T in the height direction is also decided.

Inside the case 11, the imaging unit 50 is disposed at the upper position above where the nail T is to be placed when the finger U1 is inserted in the finger fixation unit 3.

The imaging unit 50 is an obtaining unit which obtains a nail image by imaging the nail T. Nail image is an image of the finger U1 including the nail T which is obtained by imaging the nail T (the finger U1 including the nail T).

In the embodiment, imaging is carried out by the imaging unit 50 in the state where the nail T is positioned by the nail placing unit 35.

The imaging unit 50 includes an imaging device 51 and a lighting device 52.

The imaging device 51 is a small-sized camera including a solid state image sensor of over two million pixels, a lens and the like, for example.

The lighting device 52 is an illuminating light of white LED or the like, for example. In the embodiment, a plurality of lighting devices 52 are disposed so as to surround the imaging device 51.

Here, the position of the imaging device 51 and the position of the lighting devices 52 are not limited to the positions exemplified in the drawing. For example, the imaging device 51 and the lighting devices 52 of the imaging unit 50 may be disposed and fixated at the position above the nail T. Alternatively, in the case where the imaging unit 50 is structured so as to move by a moving unit, it is sufficient that the imaging unit 50 can be moved to the position above the nail T.

The imaging unit 50 is connected with the imaging controller 811 of the after-mentioned control device 80 and is to be controlled by the imaging controller 811.

Here, the image data of the image which is photographed by the imaging unit 50 may be stored in the after-mentioned storage 82.

Further, as shown in FIG. 2, the nail contour detecting device 1 of the embodiment includes the control device 80.

The control device 80 disposed on a board or the like (not shown) which is disposed on the under surface of the top board of the case 11, for example.

The control device 80 is a computer including the controller 81 which is configured by including a CPU (central processing unit) (not shown) and the storage 82 configured by including a ROM (Read Only Memory), a RAM (Random Access Memory) (both not shown) and the like.

The storage 82 includes a program storage region 820 where various types of programs and the like for operating the nail contour detecting device 1 are stored.

In the embodiment, for example, the contour detection program for detecting the contour of the nail T in the nail image which is obtained by imaging the nail T and the like are stored in the program storage region 820.

Further, in the embodiment, the storage 82 includes the contour detection information storage region 821 where information relating to contour detection which is to be referred when the contour detector 813 carries out contour detection is stored, the contour information storage region 822 in which information on the contour of the nail T which is detected by the contour detector 813 is stored and the like.

When seen in a mechanical view, the controller 81 includes the imaging controller 811, the contour detector 813 and the like. Functions of the imaging controller 811, the contour detector 813 and the like are realized by the cooperation between the CPU of the controller 81 and the programs stored in the program storage region 820 of the storage 82.

The imaging controller 811 controls the imaging device 51 and the lighting devices 52 of the imaging unit 50 and makes the imaging device 51 photograph an image (nail image) of the finger U1 including the image of the nail T which is the target of the contour detection.

In the embodiment, as described later, contour information of the nail T (a nail in the past, "nail Tp" in FIG. 3A and the like) of the user is to be obtained at the time when the nail contour detecting device 1 is purchased or the like. The imaging controller 811 controls the imaging unit 50 and makes the imaging unit 50 photograph the nail Tp as it is at the time when the device is purchased or the like to obtain the nail image of the nail Tp (hereinafter, this is called "the first nail image", see FIG. 3A).

Here, the contour information of the nail Tp is the coordinate data (the first feature point data) of each of the first feature points A1 to An (the feature point A19 in the embodiment) which makes up the first nail contour Ta (hereinafter, also merely called "feature points A", see FIG. 3A).

In the embodiment, with respect to the nail Tp as it is at the time when the device is purchased, the imaging unit 50 is to photograph all of the nails T of the fingers U1 to which various types of processes (for example, nail printing on the nails T, auto nail polishing and auto nail care to automatically treat the surfaces of the nails T and the like) are expected to be carried out later by a user referring to the contour shapes of the nails T to obtain the nail images of the nails Tp (the first nail images).

In the embodiment, when a nail image of a nail Tp (the first nail image) is obtained, the display 13 or the like is made to display the image and the first nail contour Ta is to be manually cut out (obtained) by the user tracing the line which is determined to be the contour by the user himself/herself on the touch panel or the like formed on the display 13.

Here, the way in which the user manually cut out the first nail contour Ta is not limited to a specific way. For example, the nail image of the nail Tp (the first nail image) which is photographed by the imaging unit 50 may be sent to an external terminal device or the like (not shown), and the nail contour (the first nail contour Ta) may be cut out by using a stylus pen or the like on the display of the terminal device or the like.

Further, in the case where the user carries out a specific treatment such as drawing a design on the nail T by a drawing device (not shown), the contour information of the nail T (the nail as the detection target, "nail Tn" in FIG. 3B and the like) is to be obtained under the present condition of the user in order to specify a region that is the target for the treatment such as the drawing or the like. The imaging controller 811 controls the imaging unit 50 and makes the imaging unit 50 photograph the nail T as it is at the time of the above treatment or the like to obtain the nail image of the nail Tn (hereinafter, this is called "the second nail image", see FIG. 3B).

Here, contour information of the nail Tn is the coordinate data (the second feature point data) of each of the second features points D1 to Dn (the feature point D19 in the embodiment) which makes up the second nail contour Td (hereinafter, also merely called "feature points D", see FIG. 3B).

The contour detector 813 detects a nail contour having greater reliability with respect to the nail Tn (detection target) as it is at the time of treatments or the like on the basis of the contour information relating to the nail Tp as it is at the time when the device was purchased (that is, the first contour Ta and the first feature point data which makes up the first contour Ta (that is, the coordinate data of each of the feature points A1 to A19) and the contour information relating to the nail Tn as it is at the time of treatment and the like (that is, the second contour Td and the second feature point data which makes up the second contour Td (that is, the coordinate data of each of the feature points D1 to D19). Hereinafter, the contour detection process carried out by the contour detector 813 according to the embodiment will be described in detail.

First, when obtaining the contour information relating to the nail Tp as it is at the time when the device is purchased or the like, if the first nail contour Ta is manually obtained by a user tracing the line in the nail image of the nail Tp that is determined as the contour, the contour detector 813 sets the first feature point data (that is, the coordinate data of each of the feature points A1 to A19) which makes up the first nail contour Ta on the first nail contour Ta.

In particular, the contour detector 813 first finds the center Ac (see FIG. 3A) of the first nail contour Ta and then, sets the point where the line drawn straight to the tip direction of the nail T (the nail Tp) from the center Ac and the first nail contour Ta intersect as the feature point A1. From this intersecting point, the contour detector 813 automatically sets the points A2, A3 . . . An (in the embodiment, A19) along the first nail contour Ta in the counter-clockwise direction by having approximately equal intervals therebetween.

Here, "the center" is the point where the sum of the primary moment becomes 0 in the figure (in the embodiment, a nail (the nail Tp)).

Figure 3A:
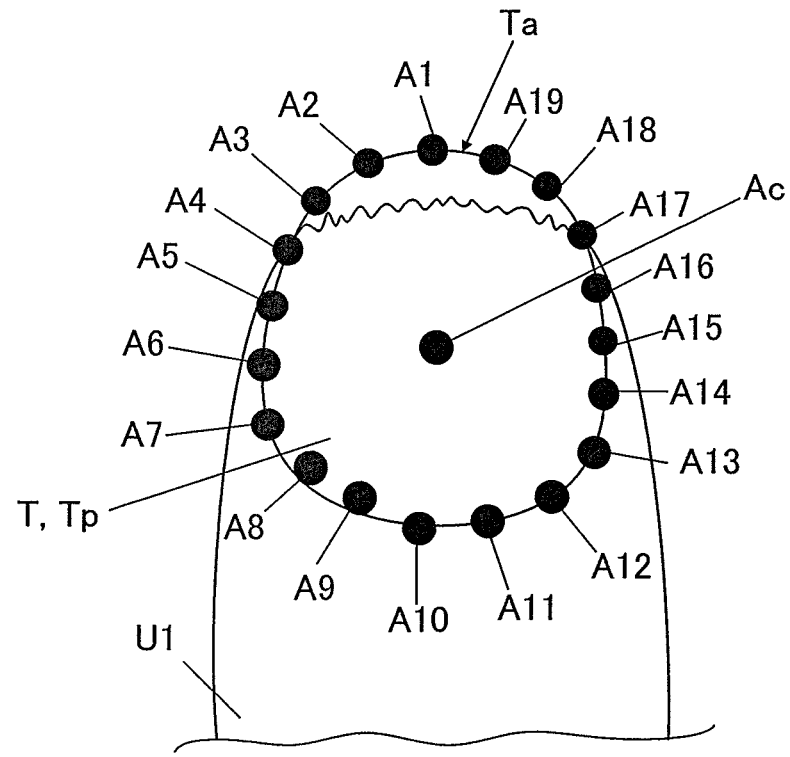
FIG. 3A is a plan view where the first nail contour and the first feature points which make up the first nail contour are overlaid on the first nail image.

Further, in FIG. 3A and the like, an example where 19 points, A1 to A19, are set on the first nail contour Ta as the feature points. However, the number of feature points to be set on the first nail contour Ta is not limited to 19 and more points may be set or less points may be set.

Furthermore, the feature points A1 to A19 are not limited to be automatically set by the contour detector 831. The feature points A1 to A19 may be manually set by a user in the way similar to the way the first nail contour Ta is set.

The first nail contour Ta and the first feature point data (that is, the coordinate data of the feature points A1 to A19) which makes up the first nail contour Ta are obtained for each finger (that is, from the thumb to the little finger of the right hand and from the thumb to the little finger of the left hand) of the user and are stored in the contour information storage region 822 of the storage 82 by being corresponded with the information specifying the user and each finger type.

Further, when obtaining the contour information relating to the nail Tn as it is at the time of treatment and the like, the contour detector 813 cuts out (detects) the contour of the nail Tn (this is called "the second nail contour Td", see FIG.

3B) in the nail image (the second nail image) which is obtained with respect to the nail Tn as it is at the time of treatment and the like.

Although the way in which the contour detector 813 carries out the contour detection is not specifically limited, the contour (the second nail contour Td) of the nail T (nail Tn) which is the detection target is detected in the detection target image (the second nail image) by using ESR (Explicit Shape Regression) method, for example.

ESR is a method that generates the initial shape (shape model) in which feature points are disposed around the center and carries out fitting between the generated initial shape and the image (nail image) including the detection target (in the embodiment, the nail Tn). For example, as it is introduced in "Face alignment by Explicit Shape Regression" (Xudong Cao, Yichen Wei, Fang Wen and Jian Sun, CVPR 2012:2887-2894) (Non-patent document 1) and the like, in the contour detection using ESR, the two-scale weak regressors (weak classifiers) are applied in combination to carry out the contour detection in terms of regression problem where the initial shape (shape model) is gradually converged toward the contour of the detection target which is the correct position.

After detecting the contour of the nail Tn (that is, the second nail contour Td), the contour detector 813 sets the second feature point data (that is, the coordinate data of each of the feature points D1 to D19) which makes up the second nail contour Td on the second nail contour Td.

In particular, the contour detector 813 first finds the center Dc (see FIG. 3B) of the second nail contour Td and then, the contour detector 813 sets the point where the line drawn straight to the tip of the nail T from the center Dc intersects with the second nail contour Td as the feature point D1. From this intersecting point, the contour detector 813 automatically sets D2, D3 . . . Dn along the second nail contour Td in the counter-clockwise direction having approximately equal intervals therebetween. Here, the number of feature points to be set is 19 which is the same number as the feature points A1 to A19 set on the contour of the nail Tp (that is, the first nail contour Ta).

Here, in the embodiment, after setting the feature points D1 to D19, the contour detector 813 divides the feature points D1 to D19 in a plurality of blocks (position groups) according to their positional relation.

Figure 3B:
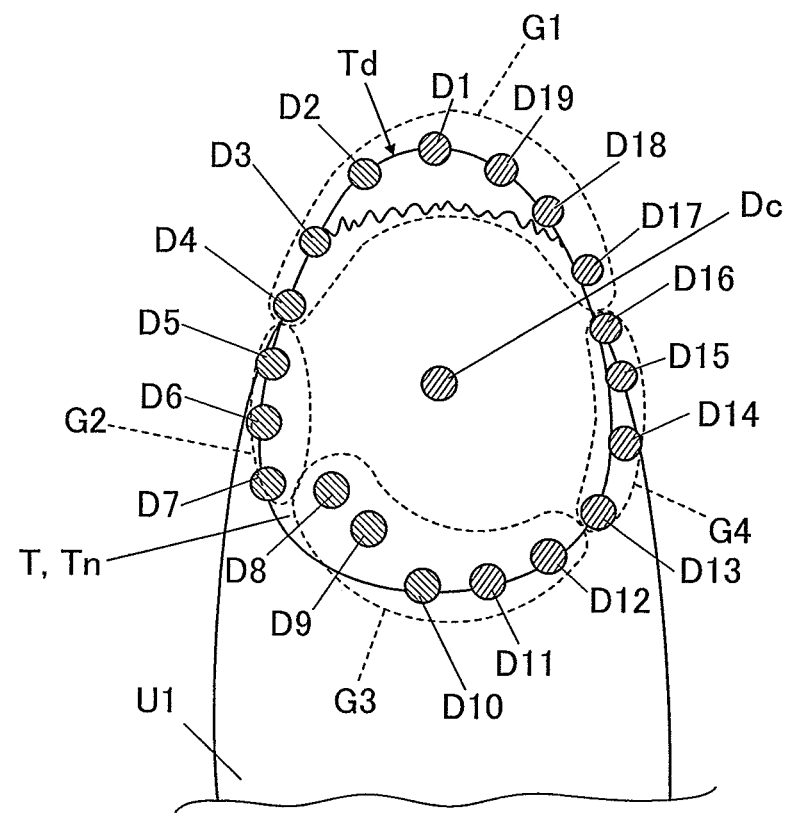
FIG. 3B is a plan view where the second nail contour and the second feature points which make up the second nail contour are overlaid on the second nail image.

In FIG. 3B, an example where the feature points D1 to D19 are divided in four position groups which are the upper section group G1 belonging to the upper position in the nail T, the lower section group G2 belonging to the lower position in the nail T, the left section group G3 belonging to the left position in the nail T and the right section group G4 belonging to the right position in the nail T. Here, the positions used for dividing in groups, the number of position groups to be set and the like are not specifically limited and are not limited to the example shown in the drawings.

Here, the method in which the contour detection is carried out in terms of regression problem as in ESR has a great robustness comparing to the method of AAM or the like where the contour detection is carried out by fitting the shape model. Therefore, although even if which shape is to be used as the initial shape and the initial position where the initial shape is to be disposed are not strictly set, this has very little effect on the accuracy of the detection result.

Therefore, for example, even in the case where each of the detection target images which are input vary greatly from each other such as having an image of a nail of a fat finger and having an image of a nail of a thin and small finger, the common initial shape can be applied to carry out the contour detection.

However, in the contour detection using an algorithm such as ESR, there is no index to evaluate the reliability of the detection result. Therefore, with respect to the points detected as a nail contour, it is preferred to independently evaluate the level of likeliness to the contour of the nail T to obtain the contour detection result having greater reliability.

Therefore, in the embodiment, reliability with respect to the second feature point data (that is, the coordinate data of each of the feature points D1 to D19) which makes up the nail contour of the nail Tn (the second nail contour Td) which is automatically detected by the contour detector 813 is calculated.

In particular, the classifier C which is obtained in advance by learning is stored in the contour detection information storage region 821 of the storage 82 in the nail contour detecting device 1 of the embodiment. The contour detector 813 first applies the classifier C to the detection target image (the second nail image) to evaluate all of the pixels in the image (the second nail image) and generates the reliability map M (see FIG. 4) of the nail contour (the second nail contour Td).

With respect to an arbitrary point in the image including the contour (the contour of the nail Tn in the embodiment), the classifier C evaluates the "likeliness to contour" thereof, that is, whether the arbitrary point makes up the second nail contour Td of the detection target (the nail Tn in the embodiment).

In order to generate the classifier C, a plurality of sample images (not shown) for learning that include a contour of the learning target (a nail in the embodiment) are obtained to carry out learning by using the plurality of sample images for learning.

Although the learning method for generating the classifier C is not specifically limited, supervised learning such as SVM (support vector machine) or the like can be used, for example.

In supervised learning, a person inputs the contour (the correct contour) of the correct detection target (in the embodiment, the nail T) in advance with respect to all of the sample images for learning and each sample image and the correct contour are made to correspond with each other. Then, the contour points are classified in two classes by giving the positive instance class labels to the contour points (the coordinate data of each point) which position on the contour (the correct contour) and giving the negative instance class labels to the non-contour points (the coordinate data of each point) which position at parts other than on the contour (the correct contour). Thereafter, the learning data set including the positive instance set and the negative instance set of the sample images for learning are stored in the storage 82 or the like as a learning sample.

Then, a "point" is arbitrarily selected among the sample images and the feature amount is calculated from the sample images with respect to the "point".

As for the feature amount, HOG (Histograms of Oriented Gradients) may be used, for example. HOG is the feature amount in which the brightness gradient direction in localized regions (cells) is shown in a histogram.

In order to calculate the HOG feature amount, brightness gradient is calculated from the images (sample images), the gradient direction histogram of brightness is created with the calculated gradient intensity and the gradient direction and the gradient direction histogram is normalized.

Here, what is used for the feature amount is not specifically limited and something other than HOG may be used.

Further, the calculated feature amount is input in the classifier and learning of the classifier is carried out by identifying the calculated feature amount as a positive instance or a negative instance. When the classifier C as a result of learning is generated, it is stored in the contour detection information storage region 821.

Here, one classifier C may be generated for the entire image or the image may be divided in regions having different features and a classifier C may be generated for each of the divided regions (for example, regions belonging to the position groups G1 to G4 shown in FIG. 3B).

The classifier C may be generated in the nail contour detecting device 1 or may be generated in advance in another device and stored in the contour detection information storage region 821.

Figures 4, 5:
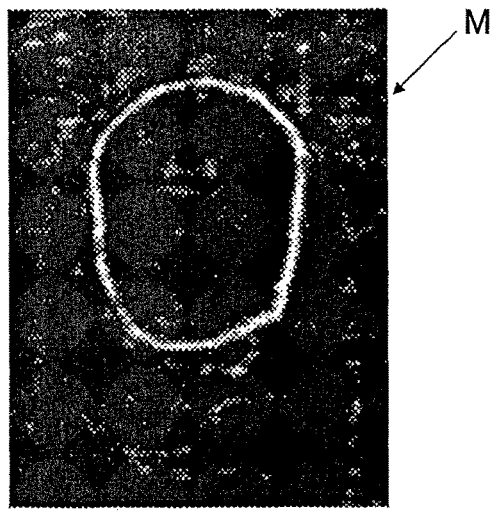
FIG. 4 is a plan view showing an example of a reliability map according to the embodiment.
FIG. 5 shows an example of the content of the reliability map according to the embodiment.

FIG. 4 shows an example of the reliability map M of the nail contour which is obtained as a result of evaluating all of the pixels in the second nail image by the contour detector 813 applying the classifier C to the detection target image (the second nail image). FIG. 5 is a list of the reliability TD of each of the second feature points D1 to D10 which make up the second nail contour Td.

In FIG. 5, the reliabilities TD1, TD2 . . . TD19 respectively correspond with the second feature points D1, D2 . . . D19.

In FIG. 5, the maximum level of reliability is "250" and the higher the value, the greater the level of reliability of the feature point and the lower the value, the lower the level of reliability.

In the example shown in FIG. 5, the reliability TD8 of the second feature point D8 is 100, the reliability TD9 of the second feature point D9 is 105 and the reliability TD15 of the second feature point D15 is 120. Here, the reliabilities are relatively low.

After obtaining the first feature points A1 to An (in the embodiment, n=19, see FIG. 3A) which make up the first nail contour Ta which is cut out in the first nail image in the way as described above (in the embodiment, n=19, see FIG. 3B), the second feature points D1 to Dn which make up the second nail contour Td which is cut out in the second nail image and the reliability map M (see FIG. 4), the contour detector 813 carries out the alignment of the first nail contour Ta and the second nail contour Td.

Hereinafter, the specific aligning method will be described in detail.

In the embodiment, the contour detector 813 makes the first nail contour Ta and the second nail contour Td match to each other by making the points having corresponding numbers such as the feature point A1 and the feature point D1, the feature point A2 and the feature point D2 . . . the feature point An and the feature point Dn be corresponding points.

Then, the contour detector 813 randomly selects two pairs among the n matches (in the embodiment, 19 matches), creates a similarity transformation matrix G, converts the rest of the matches which were not selected with the transformation matrix G, calculates the evaluation points from the matching within the acceptable error range in the matches and evaluates the transformation matrix G. As for the specific method for giving an evaluation point, the method described below will be used.

That is, for example, in the case where the transformation matrix G is to be evaluated by using the matching of certain feature points (suppose this is "m") (in this example, the matching of the feature point Am and the feature point Dm) among n feature points (in the embodiment, 19 feature points), the feature point Am is converted with the transformation matrix G and the transformation matrix G is evaluated by the size of error between the position of the converted feature point Am and the position of the feature point Dm.

When carrying out the evaluation of the transformation matrix G, TDm which is the reliability of the feature point Dm is to be referred to. In the case where TDm is greater than a certain threshold, it can be considered that the feature point Dm is a "point" on the contour. Therefore, it is determined that the matching is within the acceptable error range in the case where the error is smaller than a certain value (that is, when a certain error (the error threshold) is set as "eerTH1" and when the calculate error<eerTH1) and the evaluation point is added.

On the other hand, if the reliability TDm of the feature point Dm is smaller than a certain threshold, it can be considered that the feature point Dm is a "point" which is not on the contour. Therefore, it is determined that the matching is within the acceptable error range when the error equals to a certain size or greater and equals a certain size or less (that is, a certain level of error (the lower error threshold) is set as "eerTH2" and a certain level of error (the upper error threshold) is set as "eerTF3", and when eerTH2<error<eerTH3) and the evaluation point is added.

Here, the level of each of the certain levels of error (the error thresholds) may be set in an arbitrary manner.

As described above, the contour detector 813 carries out the evaluation where the evaluation point is added if more accurate matching is achieved in the case where the feature point Dm is on the contour, the evaluation point is added if more lenient matching is achieved in the case where the feature point Dm is slightly off the contour, and the evaluation point is not added in the case where the feature point Dm is completely off the contour.

Further, the contour detector 813 adds evaluation points according to the position group (that is, in the embodiment, the four position groups which are the upper section group G1, the lower section group G2, the left section group G3 and the right section group G4) where each of the points (feature points) whose matching are within the acceptable error range belongs to with respect to the transformation matrix G.

Point-adding carried out by taking the position groups into consideration is carried out by a method where the points which achieved matching (the pair of feature points Am and Dm) are counted to determine in which position group each of the points belongs to and where points are added if the points (the pair of feature points Am and Dm) evenly belong to every position group. In such way, comparing to the transformation matrix G in which only the points (pairs of feature points) that cluster in one section within the acceptable error range, the transformation matrix G in which the entire contour is evenly aligned has higher evaluation point.

The contour detector 813 evaluates the above-described transformation matrix G for a plurality of times and carries out the alignment process by using the transformation matrix G which has the highest evaluation point. Here, how many times the evaluation is to be carried out may be set in an arbitrary manner.

The contour which is obtained by carrying out the above-described alignment process is set to be the nail contour Ti and the feature points on the contour are set to be I1, I2 . . . In (in the embodiment, I19) (see FIG. 10). Further, reliability of each of the feature points I1, I2 . . . In on the contour Ti is obtained by using the reliability map M and the reliability of the feature point I1 is set as TI1, the reliability of the feature point I12 is set as TI2 and the reliability of the feature point In is set as TIn.

The contour detector 813 stores the contour Ti, the feature points I1, I2 . . . In which make up the contour Ti and the reliabilities TI1, TI2 . . . Tin of the feature points I1, I2 . . . In, respectively, in the contour detection information storage region 821 or the like.

Next, with respect to the nails T (Tp and Tn) of the same finger, the contour detector 813 merges (combines) the second contour Td which is automatically cut out by ESR or the like and the nail contour Ti which is obtained by the alignment process by using the reliabilities obtained by applying the reliability map M. Here, the nail contour Ti is obtained by carrying out the alignment process between the first nail contour Ta and the second nail contour Td, the first nail contour Ta being cut out in a method (for example, manual input carried out by a user) that is different from the method by which the second nail contour Td is cut out.

Then, the contour obtained by such merging process (combining process) is set to be the combined nail contour Tm and the feature points on the combined nail contour Tm are set to be M1, M2 . . . Mn.

That is, for example, in the case where one feature point among n feature points (in the embodiment, 19 feature points) is set as "1", with respect to the feature point I1 on the contour Ti to which the alignment process with the feature point Di on the second nail contour Td has already carried out, if the reliability TDI and the reliability TI1 both are greater or equal to a certain level, the contour detector 813 makes the second feature point D1 be the feature point M1 of after the merging process (that is, M1=D1) since it can be considered that the second nail contour Td which is detected by using the nail T (Tn) is more close to the accurate contour. Further, with respect to the feature point I1 of the nail contour Ti of after the alignment process with the feature point D1 of the second nail contour Td, the contour detector 813 selects whichever that has greater reliability when either of the reliability TD1 and the reliability TI1 is greater than or equal to a certain level.

That is, in the case where the reliability TD1 of the second feature point D1 of the second nail contour Td is greater than the reliability TI1 of the feature point I1 of the nail contour Ti of after the alignment process by a certain level or more (that is, TD1>TI1), the contour detector 813 makes the second feature point D1 be the feature point M1 of after the merging process (that is, M1=D1).

On the other hand, in the case where the reliability TI1 of the feature point I1 of the nail contour Ti of after the alignment process is greater than the reliability TD1 of the second feature point D1 of the second nail contour Td by a certain level or more (that is, TI1>TD1), the contour detector 813 makes the feature point I1 of the nail contour T1 of after the alignment process be the feature point M1 of after the merging process (that is, M1=I1).

Further, if the reliability TDi of the second feature point D1 of the second nail contour Td and the reliability TI1 of the feature point I1 of the nail contour Ti of after the alignment process are both equal to or lower than a certain level, the reliability TD1 and the reliability TI1 are both blended as coefficients. As a result, M1=(TI1*I1+TD1*D1)/(I1+D1) is true.

Here, the references (thresholds) for being "equal to or greater than a certain level" and for being "equal to or lower than a certain level" are set in an arbitrary manner.

Next, the nail contour detecting method according to the embodiment will be described with reference to FIGS. 6 to 10.

Figure 6:
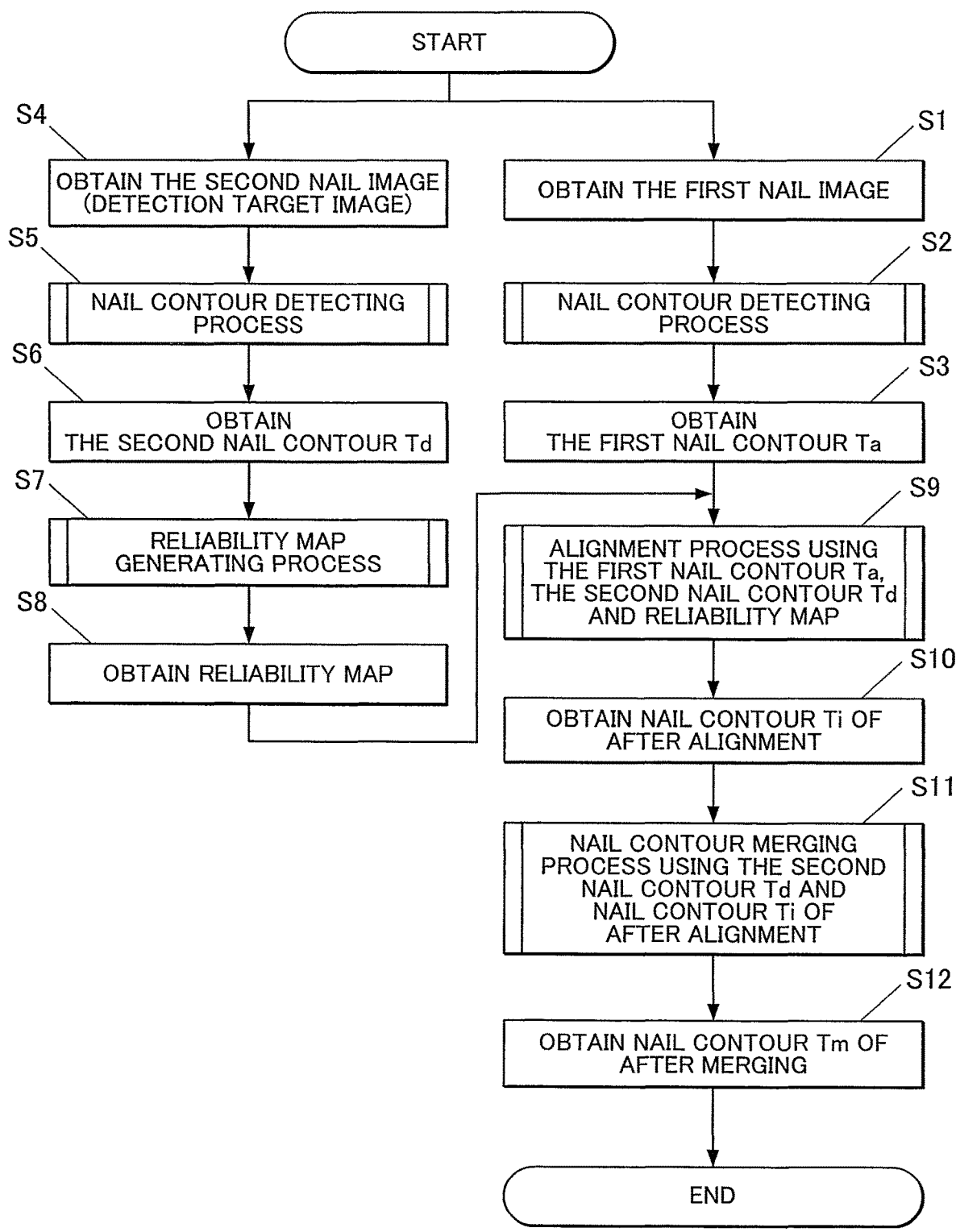
FIG. 6 is a flowchart showing an overall process carried out in the nail contour detecting device according to the embodiment.

FIG. 6 is a flowchart showing the overall flow of the nail contour detecting process which is carried out by the nail contour detecting device 1 of the embodiment.

As shown in FIG. 6, in the embodiment, first, the imaging controller 811 controls the imaging unit 50 and makes the imaging unit 50 photograph a finger U1 including a nail T (nail Tp) of a user to obtain the first nail image at the time when the nail contour detecting device 1 is purchased or the like (step S1).

Then, by the user manually specifying the line which he/she thinks is the contour of the nail T in the first nail image, the first nail contour Ta (see FIG. 3A) is cut out (step S2). This is obtained by the controller 81 (step S3) and is stored in the contour information storage region 822. Here, in the embodiment, the first nail image and the first nail contour Ta are obtained with respect to each of all 10 fingers, from the thumb to the little finger of each of the left hand and the right hand, for example, and the first nail images and the first nail contours Ta are stored and registered with information which specifies the user and the finger type thereof.

After the first nail contour Ta is obtained, the contour detector 813 sets the first feature points A1 to An (in the embodiment, 19 feature points which are A1 to A19) which make up the first nail contour Ta and further, the coordinate data (the first feature point data) of each of the feature points is also made to be corresponded with the first nail contour Ta or the like and is stored in the contour information storage region 822.

Next, in the case where various types of processes and treatments are to be carried out to the nail T, when obtaining the contour of the nail T which is the detection target as premises therefore, the imaging controller 811 controls the imaging unit 50 and makes the imaging unit 50 photograph the finger U1 including the nail T (nail Tn) of the user to obtain the second nail image (detection target image) (step S4).

Then, by using the method of machine learning of ESR or the like, the second nail contour Td of the nail T is detected in the second nail image (step S5) to obtain the second nail contour Td (step S6). With respect to this second nail contour Td, the contour detector 813 sets the second feature points D1 to D19 which makes up the second nail contour Td and the coordinate data (the second feature point data) of each of the feature points D1 to D19 is also made to be corresponded with the second nail contour Td and is stored in the contour information storage region 822.

Further, after the second nail image is obtained, the contour detector 813 carries out the reliability map generating process where the contour detector 813 evaluates the reliability with respect to all of the pixels included in the image (step S7) to generate the reliability map M (see FIG. 4) (step S8).

Thereafter, the contour detector 813 carries out the alignment process of the first nail contour Ta and the second nail contour Td by using the first nail contour Ta, the second nail contour Td and the reliability map M (step S9).

Here, the alignment process according to the embodiment will be described in detail with reference to FIG. 7 and the like.

Figure 7:
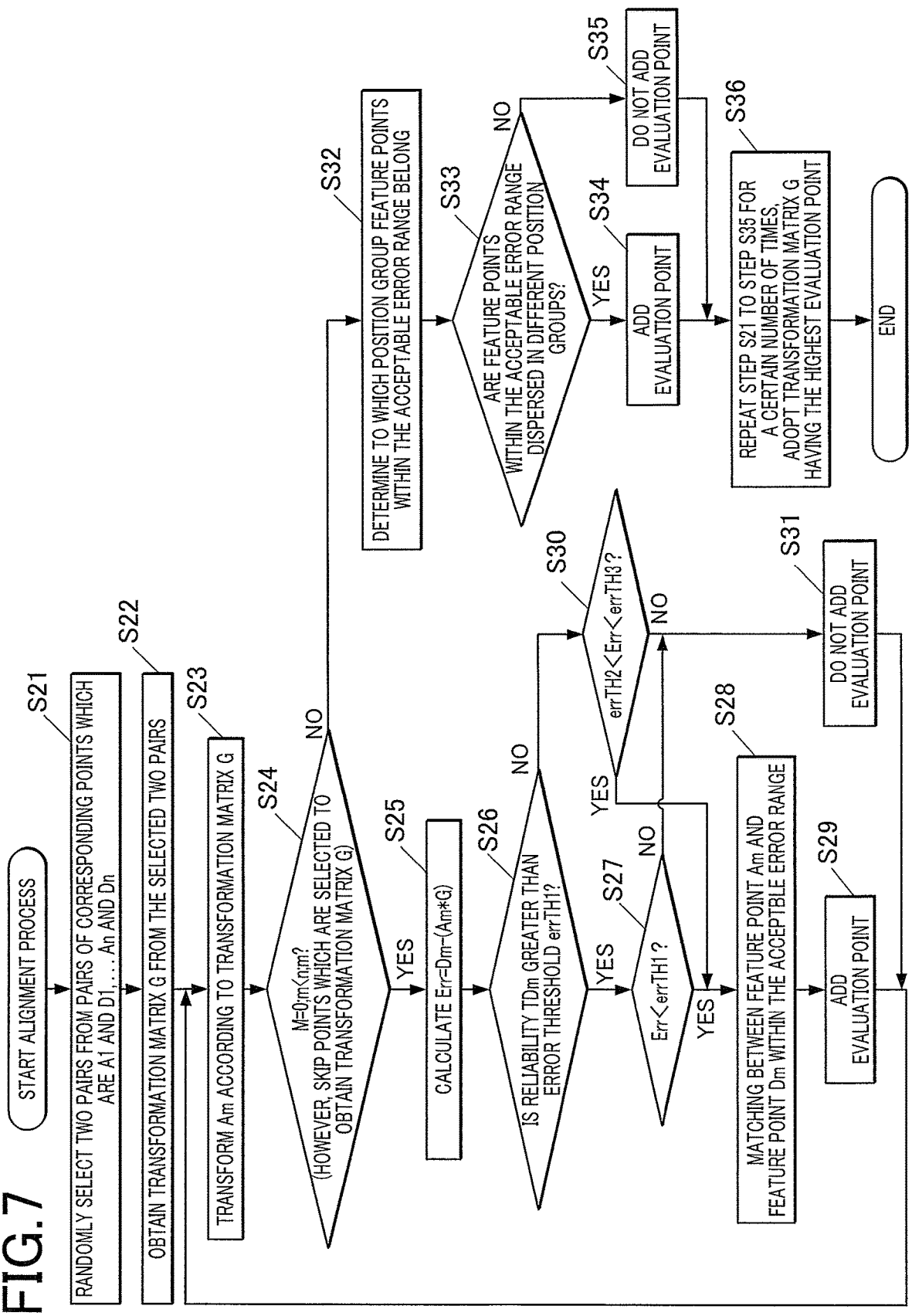
FIG. 7 is a flowchart showing an alignment process carried out in the nail contour detecting device according to the embodiment.

As shown in FIG. 7, in the case where the alignment process is to be carried out, the contour detector 813 first creates pairs of corresponding points by making the feature points A1 to A19 of the first nail contour Ta and the feature points D1 to D19 of the second nail contour Td respectively correspond with each other and randomly select two pairs among the pairs of corresponding points (step S21).

Then, the contour detector 813 obtains the transformation matrix G by the selected two pairs (step S22) and carries out the transform processing by the transformation matrix G with respect to any one of the feature points A1 to A19 of the first nail contour Ta ("feature point Am" in FIG. 7 and the like) (step S23).

The contour detector 813 determines whether the feature point Am to which transform processing by the transformation matrix G is carried out is any one of the feature points A1 to An (in the embodiment, the feature point A19) which is the target for the alignment processing ("m=0; m<n; m?" in FIG. 7) (step S24). However, the points which are selected when obtaining the transformation matrix G are to be skipped. If the feature point Am is one of the feature points A1 to An (however, other than the points which are selected when obtaining the transformation matrix G) (step S24; YES), the contour detector 813 calculates the error between the feature point Dm and the feature point Am of after the transform processing ("Err" in FIG. 7) (step S25, "calculate Err=Dm−(Am*G)" in FIG. 7).

Next, the contour detector 813 applies the reliability map M and determines whether the reliability TDm of the feature point Dm is greater than a certain value (step S26). Here, the level of "a certain value" in such case may be set in an arbitrary manner.

Then, if the reliability TDm is greater than a certain value (step S26; YES), the contour detector 813 further determines whether the error "Err" between the feature point Dm and the feature point Am of after the transform processing is smaller than a predetermined threshold "errTH1" (step S27), and if the error is smaller than the predetermined threshold (step S27; YES), the contour detector 813 determines that the matching of the feature point Am and the feature point Dm is within the acceptable error range (that is, determines that the feature point Am and the feature point Dm are corresponding points (pair) within the threshold (step S28) and then, the contour detector 813 adds the evaluation point with respect to the transformation matrix G (step S29).

On the other hand, if the reliability TDm is not greater than a certain value (step S26; NO), the contour detector 813 further determines whether the error "Err" between the feature point Dm and the feature point Am of after the transform processing is greater than the predetermined threshold "errTH2" and smaller than the predetermined threshold "errTH3" (step S30). If the error "Err" is greater than "errTH2" and smaller than "errTH3" (step S30; YES), the contour detector 813 determines that the matching of the feature point Am and the feature point Dm are within the acceptable error range (that is, the contour detector 813 determines that the feature point Am and the feature point Dm are corresponding points (pair) within the threshold, step S28) and then, the contour detector 813 adds the evaluation point with respect to the transformation matrix G (step S29). In contrary, if the error "Err" does not fulfill the condition of "errTH2<Err<errTH3" (step S30; NO), the contour detector 813 do not add the evaluation point with respect to the transformation matrix G (step S31).

In such way, in the embodiment, if the reliability TDm which is derived by applying the reliability map M is low (that is, step S26; NO), weighting in which the acceptable error "Err" range is to be narrow comparing to the case where the reliability TDm is high (that is, step S26; YES) is carried out. In the case where the feature point Dm whose reliability TDm is low and the possibility of being wrong is high corresponds with the feature point Am as a result of transform processing, the possibility is high that the transformation matrix G which is used for transform processing is not correct. Therefore, in such case, the evaluation value of the transformation matrix G can be made low by carrying out weighting so that the evaluation point will not be easily added.

Here, the levels of "errTH1", "errTH2" and "errTH3" which are the predetermined thresholds used when determining whether the error "Err" is acceptable may be set in an arbitrary manner.

Here, a specific example of matching of the feature point Am and the feature point Dm will be described with reference to FIGS. 8A and 8B.

Figure 8A:
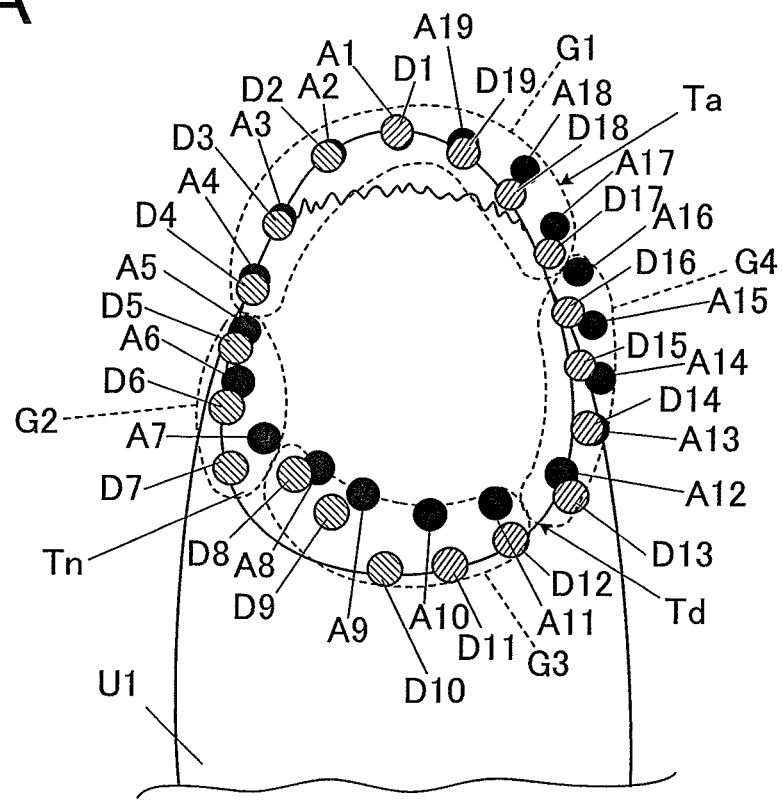
FIGS. 8A and 8B are plan views showing examples of alignment of the first nail contour and the second nail contour.
Figure 8B:
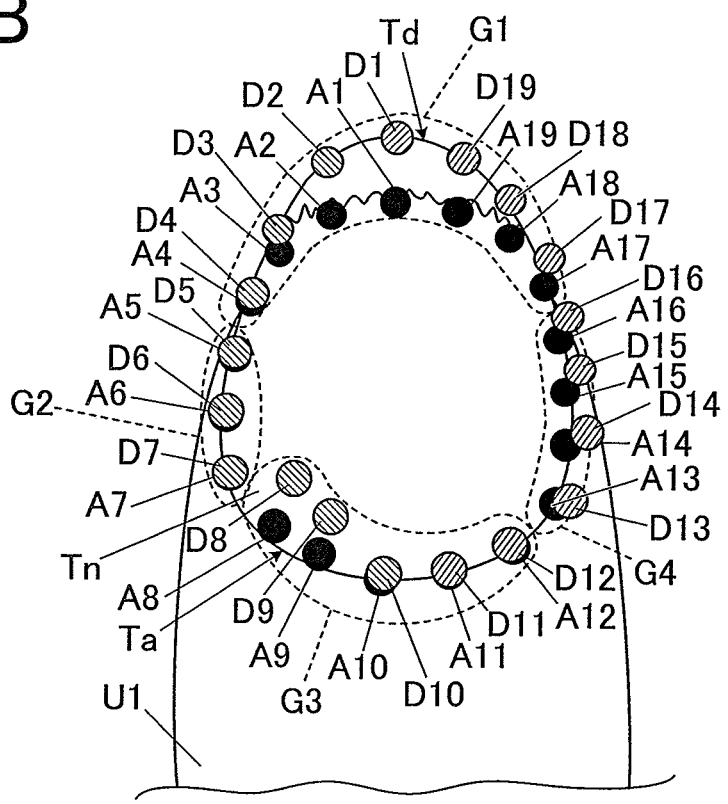

FIGS. 8A and 8B are drawings showing an example where the first nail contour Ta (the feature points A1 to A19 which make up the first nail contour Ta) is aligned with the second nail contour Td (the feature points D1 to D19 which make up the second nail contour Td) included in the second nail image (detection target image). FIG. 8A shows an example where the alignment is attempted so as to match the upper section of the first nail contour Ta to the upper section of the second nail contour Td. FIG. 8B shows an example where the alignment is attempted so as to match the lower section of the first nail contour Ta to the lower section of the second nail contour Td.

In the example shown in FIG. 8A, among the feature points A1 to A19 and the feature points D1 to D19, (A1, D1), (A2, D2), (A3, D3), (A4, D4) and (A19, D19) are completely or mostly matched to each other. Further, (A5, D5), (A6, D6), (A8, D8), (A9, D9), (A17, D17) and (A18, D18) are disposed within a certain distance from each other. In contrary, (A7, D7), (A10, D10), (A11, D11), (A12, D12), (A13, D13), (A14, D14), (A15, D15) and (A16, D16) are distanced from each other.

The contour detector 813 refers to the reliability map M (see FIG. 4) and obtains the values of the reliabilities TD1 to TD19 (see FIG. 5) of the feature points D1 to D19. If the reliability is greater than a predetermined value, the contour detector 813 determines that it is within the acceptable error range when the error between the feature point Am and the feature point Dm is smaller or equal to the predetermined error "errTH1" and adds the evaluation point.

As shown in FIG. 5, in the embodiment, all of the feature points D1, D2, D3, D4 and D19 have relatively high values of reliability (for example, the reliability TD1 of the feature point D1=250, the reliability TD2 of the feature point D2=230 and the like). Therefore, with respect to (A1, D1), (A2, D2), (A3, D3), (A4, D4) and (A19, D19), it is determined that it is within the acceptable error range if the points are mostly matched even if they are not completely matched, for example, and the evaluation point is added.

Further, for example, the feature points D8, D9 and D15 all have relatively low values of reliability (the reliability TD8 of the feature point D8=100, the reliability TD9 of the feature point D9=105, the reliability TD15 of the feature point D15=120).

Therefore, with respect to the feature points D8, D9 and D15, it is determined that it is within the acceptable error range only when the error "Err" between the feature point Am and the feature point Dm fulfills the condition of "errTF2<Err<errTH3", that is only when the error is small (when the feature points are disposed within a certain distance) and the evaluation point is added. In the example shown in FIG. 8A, since (A8, D8) and (A9, D9) are within a distance within a predetermined error range, the contour detector 813 determines that it is outside the acceptable error range and adds the evaluation point. On the other hand, with respect to the feature points (A15, D15), since the error between the points is great, the contour detector 813 determines that it is within the acceptable error range and does not add the evaluation point.

Further, in the example shown in FIG. 8B, among the feature points A1 to A19 and the feature points D1 to D19, (A4, D4), (A5, D5), (A6, D6), (A7, D7), (A10, D10), (A11, D11), (A12, D12) and (A13, D13) are completely or mostly matched with each other. Further, (A3, D3), (A9, D9), (A14, D14), (A15, D15), (A16, D16) and (A17, D17) are disposed within a certain distance from each other. In contrary, (A1, D1), (A2, D2), (A8, D8), (A18, D18) and (A19, D19) are distanced from each other.

As described above, in the embodiment, the feature points D8, D9 and D15 all have relatively low reliability values (the reliability TD8 of the feature point D8=100, the reliability TD9 of the feature point D9=105, the reliability TD15 of the feature point D15=120).

Therefore, with respect to (A8, D8), (A9, D9) and (A15, D15), the contour detector 813 determines that it is within the acceptable error range when the error "Err" between the feature point Am and the feature point Dm fulfills the condition of "errTH2<Err<errTH3", that is only when the error is small (when the feature points are disposed within a certain distance) and adds the feature point. In the example shown in FIG. 8B, since the feature points (A9, D9) and (A15, D15) are within a distance within a predetermined error range, the contour detector 813 determines that it is within the acceptable error range and adds the evaluation point. On the other hand, since the error is large with respect to the feature points (A8, D8), the contour detector 813 determines that it is outside the acceptable error range and does not add the evaluation point.

After the processing of adding the evaluation point (step S29) or not-adding (step S31) is ended, the next feature point Am (Am+1) is set and the processes of step S23 to step S31 are repeated in the similar manner.

Then, with respect to one transforming matrix G, when the transform processing has been carried out for all of the feature points A1 to An (in the embodiment, the feature points A1 to A19) (step S24; NO), the contour detector 813 determines in which position group the feature points (the pairs of feature points) which is within the acceptable error range belongs to (step S32).

In the embodiment, as described above, the feature points D1 to D19 are divided in four position groups which are the upper section group G1 belonging to the upper position in the nail T, the lower section group G2 belonging to the lower position in the nail T, the left section group G3 belonging to the left position in the nail T and the right section group G4 belonging to the right position in the nail T, and the contour detector 813 classifies the feature points (pairs of feature points) which is within the acceptable error range in one of the four groups.

Further, the contour detector 813 determines whether the feature points (pairs of feature points) which are within the acceptable error range are dispersed and belonging in different position groups (step S33). Feature points being dispersed and belonging in different position groups means that the feature points (pairs of feature points) which are within the acceptable error range are disposed evenly in the position groups G1 to G4.

If the feature points are dispersed in different position groups (step S33; YES), the contour detector 813 adds the evaluation point to the transformation matrix G (step S34). On the other hand, if the feature points are not dispersed in different position groups (that is, if the feature points which are within the acceptable error range (pairs of feature points) are unevenly clustered) (step S33, NO), the contour detector 813 does not add the evaluation point to the transformation matrix G (step S35).

In such way, the transformation matrix G which carries out the overall alignment (that is, the transformation matrix G having a result where the feature points are almost evenly within the acceptable error range in the position groups G1 to G4) will have higher evaluation point comparing to the transformation matrix G where only a part of the feature points are within the acceptable error range (that is, the transformation matrix G having a result where the feature points are unevenly clustered such as among the position groups G1 to G4, there are groups including many feature points which are within the acceptable error range and there are groups including feature points which most of them are not within the acceptable error range).

When calculation of the evaluation point with respect to one transformation matrix G is completed as in the above-described way, the contour detector 813 repeats the processes of steps S21 to S35 again and calculates the evaluation points with respect to a plurality of transformation matrixes G, and the transformation matrix G having the highest evaluation point is adopted (step S36). Then, the alignment process of the first nail contour Ta and the second nail contour Td is carried out by using the transformation matrix G having the highest evaluation point and the nail contour Ti of after the alignment process is obtained (step S10).

After obtaining the nail contour Ti, the contour detector 813 sets the points corresponding with the feature points A1 to An of the first nail contour Ta (in the embodiment, An=A19) and the feature points D1 to Dn of the second nail contour Td (in the embodiment, Dn=D19) to the feature points I1 to In (in the embodiment, In=I19) and applies the reliability map M to obtain the reliabilities of these feature points I1 to In (in the embodiment, In=I19). Hereinafter, with respect to reliability, the reliability of the feature point I1 is set as the reliability TI1, the reliability of the feature point I2 is set as the reliability TI2, . . . the reliability of the feature point In is set as the reliability TIn.

Next, the contour detector 813 carries out the merging process by using the reliabilities obtained from the reliability map M with respect to the second nail contour Td which is automatically obtained by ESR or the like and the nail contour Ti of after the alignment which is obtained by aligning the first nail contour Ta and the second nail contour Td, for one nail (see FIG. 10) (step S11).

Then, the contour detector 813 sets the contour which is obtained by the merging process as the nail contour Tm and sets the feature points M1, M2 . . . Mn (in the embodiment, Mn=M19) on the nail contour Tm. Here, the feature points M1, M2 . . . Mn correspond with the feature points D1 to Dn (in the embodiment, Dn=D19) of the second nail contour Td and the feature points I1 to In (in the embodiment, In=I19) of the nail contour Ti of after the alignment, respectively.

The merging process will be described in detail with reference to FIGS. 9 and 10.

Figure 9:
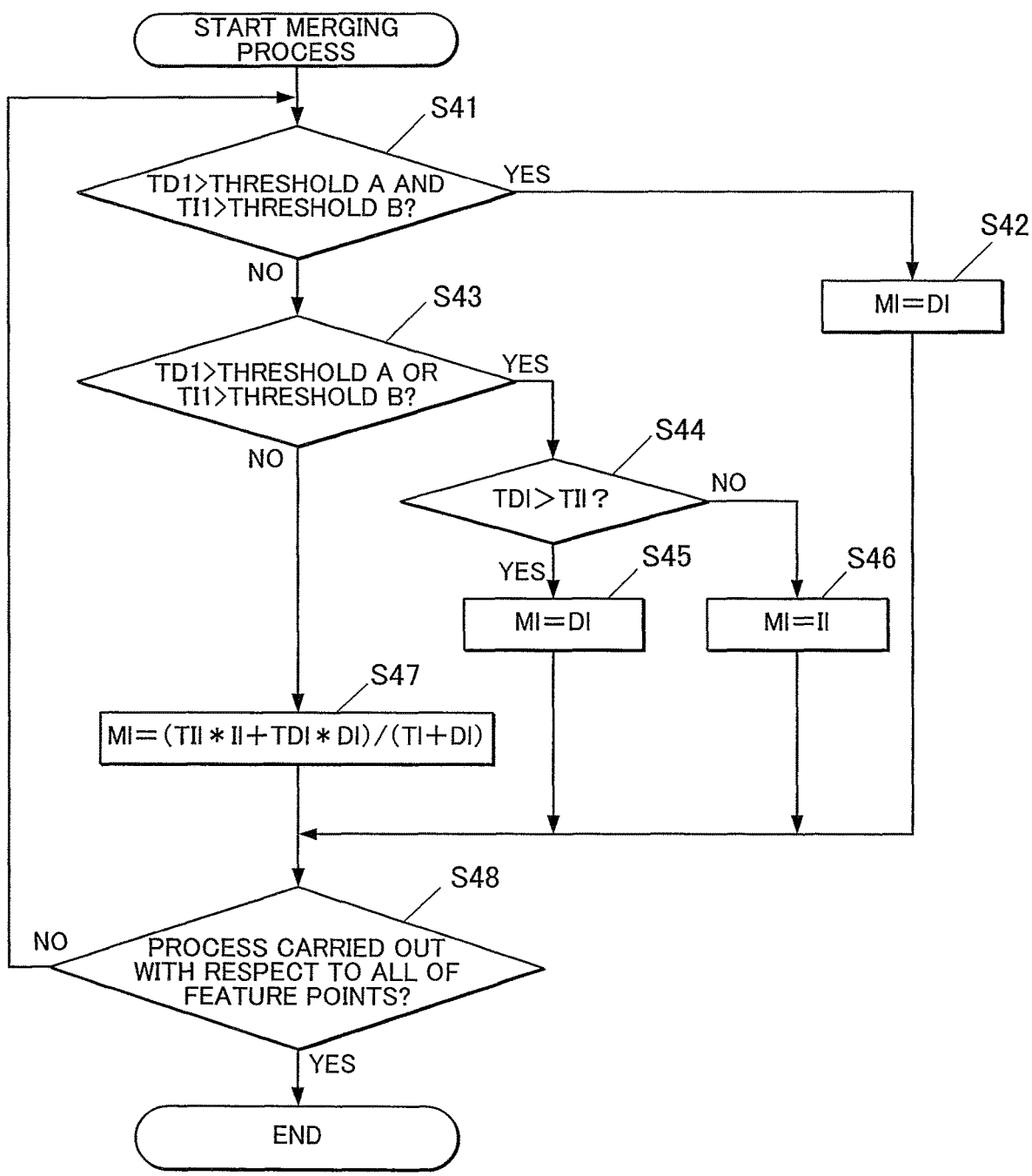
FIG. 9 is a flowchart showing a merging process carried out in the nail contour detecting device according to the embodiment.

FIG. 9 is the flowchart of the merging process. FIG. 10 is an explanatory diagram schematically showing how the merging process is to be carried out by using the reliability map M with respect to the second nail contour Td and the nail contour Ti.

Here, one of the feature points D1 to D19 of the second nail contour Td is set as "the feature point D1" in FIG. 9 and the like, and one of the feature points I1 to I19 which make up the nail contour Ti of after the alignment which corresponds with the feature point D1 is set as "the feature point I1". Further, one of the feature points M1 to M19 which make the nail contour Tm of after the merging process which corresponds with "the feature point D1" and "the feature point I1" is set as "the feature point M1". With respect to "the feature point D1", "the feature point I1" and "the feature point M1", the reliabilities obtained by applying the reliability map M are set as "the reliability TD1", "the reliability TI1" and "the reliability TM1", respectively.

As shown in FIG. 9, when the merging process is to be carried out, the contour detector 813 determines whether the reliability TD1 and the reliability TI1 with respect to the feature point D1 and the feature point I1 are both greater than a certain threshold (in FIG. 9, the threshold with respect to the reliability TD1 is "threshold A" and the threshold with respect to the reliability TI1 is "threshold B") (step S41).

If both of them are greater than a certain threshold (step S41; YES), since it can be considered that nail contour Td whose detection is carried out by using the nail T which is the detection target is more close to the correct contour, the contour detector 813 sets the feature point D1 of the nail contour Td as the feature point M1 of after the merging process (M1=D1 in FIG. 9, step S42).

On the other hand, if both of them are not greater than a certain threshold (step S41; NO), the contour detector 813 further determines whether either of the reliability TD1 and the reliability TI1 is greater than a certain threshold (step S43).

If either of the reliability TD1 and the reliability TI1 is greater than a certain threshold (set S43; YES), the contour detector 813 further determines whether the reliability TD1 is greater than the reliability TI1 (step S44).

Then, if the reliability TD1 is greater than the reliability TI1 (step S44; YES), the contour detector 813 sets the feature point D1 of the nail contour Td as the feature point M1 of after the merging process (M1=D1 in FIG. 9, step S45).

Further, if the reliability TD1 is not greater than the reliability TI1 (that is, if the reliability TI1 is greater than the reliability TD1, step S44; NO), the contour detector 813 sets the feature point I1 of the nail contour Ti as the feature M1 of after the merging process (M1=I1 in FIG. 9, step S46).

On the other hand, if both of the reliability TD1 and the reliability TI1 are lower than a certain threshold (step S43; NO), the contour detector 813 blends the reliabilities of the feature point D1 and the feature point I1 (that is, the reliability TD1 and the reliability TI1) as coefficients and sets the blended result as the feature point M1 of after the merging process ("M1=(TI1*I1+TD1*D1)/(I1+D1)" in FIG. 9, step S47).

The contour detector 813 determines whether the merging process in which the feature point M1 is obtained has ended with respect to all of the feature points (step S48). If the process is not yet ended with respect to all of the feature points (step S48; NO), the contour detector 813 returns to step S41 and repeats the process thereof. If the process has ended with respect to all of the feature points (step S48; YES), the merging process is ended.

Thereby, as shown in FIG. 10, the nail contour (the combined nail contour Tm) which includes the feature points M1 to M19 is generated (step S12).

In such way, in the embodiment, by taking the reliability of each feature point into consideration, the first nail contour Ta and the second nail contour Td are aligned. Further, by merging into one nail contour, the nail contour (the combined nail contour Tm) which is more close to the correct contour can be detected as the current nail contour to which various types of treatments are to be carried out to the nail T.

As described above, according to the embodiment, the first feature points A1 to An (the first feature point data) which make up the first nail contour Ta which is the contour of the nail Tp detected in the first nail image that is obtained at a certain point of time and the second feature points D1 to Dn (the second feature point data) which make up the second nail contour Td which is the contour of the nail Tn detected in the second nail image that is an image of the current nail Tn obtained by imaging the nail Tn of the same finger of which the first nail image was obtained are stored in the contour detection information storage region 821, the first nail contour Ta and the second nail contour Td are aligned on the basis of the reliability of the data relating to the feature points which make up the nail contour, and one combined nail contour Tm is obtained by adopting the feature point data having greater reliability.

Therefore, comparing to the case where the nail contour is detected by carrying out the contour detection once, the nail contour having higher accuracy can be detected.

In such way, in the case where nail printing is to be carried out to a nail region, for example, by using the detected nail contour (the combined nail contour Tm), running over and an untreated area will not occur and a high definition rendering process can be carried out. Further, the treatment can be carried out in the accurate range even in the case where nail care or the like is carried out automatically.

Further, in the embodiment, the first nail contour Ta and the second nail contour Td are detected in the nail image in different methods.

Therefore, the detection results may be different in the first nail contour Ta and in the second nail contour Td. Here, by generating the final nail contour (the combined nail contour Tm) by selecting the feature points having high reliability, the nail contour having higher reliability can be obtained.

Furthermore, in the embodiment, the first nail contour Ta is obtained by a user manually cutting out a contour of the nail Tp in the nail image.

For example, the border line where the nail T starts, the border sections of the nail and skin and the like are the parts where the contrast is small and where an accurate detection is difficult in machine learning. However, these sections can be accurately detected if detection is carried out manually.

In contrary, the tip section of the nail T may grow or may be cut and the shape and the length thereof change. Therefore, there is a great possibility that the nail contour (the first nail contour Td) which is manually cut out sometime in the past is not accurate. On the other hand, in the tip section of the nail T, the contrast between the nail T and the other part is large comparing to the part where the nail starts to grow and the like and the automatic detection by machine learning or the like can be carried out in a relatively accurate manner.

In the embodiment, the reliability of each feature points which makes up the contour is taken into consideration in the alignment and the merging process (combining process) of the first nail contour Ta and the second nail contour Td. Therefore, in the section where the nail starts to grow and the like, the reliability of the nail contour (the second nail contour Td) which is automatically detected by machine learning or the like is low, and the nail contour (the first nail contour Ta) which is manually detected in the combined nail contour Tm as the final detection result is preferentially adopted. In contrary, with respect to the tip section of the nail, the nail contour (the second nail contour Td) which is automatically cut out by machine learning or the like has high reliability and therefore, it is preferentially adopted in the combined nail contour Tm as the final detection result.

Thereby, the combined nail contour Tm can be made by combining the nail contours having high accuracy and the nail contour which is more accurate and having higher reliability can be detected.

Further, in the embodiment, the reliability map M which shows the reliability of the data relating to each feature point which makes up the nail contour is stored in the contour detection information storage region 821 in advance. By referring to the reliability map M, the contour detector 813 detects the contour of the nail by reflecting the reliability of each feature point (feature point data) which makes up the nail contour.

Thereby, the feature points having high reliability can be combined to make the final contour detection result and more accurate contour detection can be carried out.

Although the embodiment of the present invention is described above, the present invention is not limited to the embodiment and it is needless to say that various modifications can be carried out within the scope of the invention.

For example, in the embodiment, the case where the nail T (nail Tp) is photographed at the time when the nail contour detection device 1 is purchased or the like to obtain the first nail image and the nail T (nail Tn) is photographed when various types of treatments and the like is to be carried out to the nail T to obtain the second nail image is shown as an example, and the case where there is a time lag between the time point when the first nail image is obtained and the time point when the second nail image is obtained is assumed. However, it is not necessary to have a time lag between the time point when the first nail image is obtained and the time point when the second nail image is obtained.

For example, the information on her/his nail T can be obtained by the user when the device is purchased, the first nail image can be obtained and manual cutting out of the contour of the nail Tp can be carried out in for registration and thereafter, the second nail image (detection target image) of the nail Tn as premises for carrying out various types of treatments and the like can be obtained to carry out the cutting out or the like of the contour of the nail Tp by machine leaning or the like.

In such case, the feature points having greater reliability can also be adopted among the two types of contour detection results to be the final nail contour. Therefore, comparing to the case where detection is carried out according to the one detection result, more accurate contour detection can be expected.

Further, in the embodiment, the case where the contour of the nail Tp (the first nail contour Ta) is manually cut out in the first nail image and the contour of the nail Tn (the second nail contour Td) is cut out by machine learning (ESR or the like) in the second nail image is shown as an example. However, the methods by which the contour of the nail Tp (the first nail contour Ta) and the contour of the nail Tn (the second nail contour Td) are to be cut out are not limited to what are described in the example.

For example, machine learning of ESR or the like may also be used when cutting out the contour of the nail Tp in the first nail image.

Even in the case where detection is to be carried out twice in the same detection method, the feature points having greater reliability can be used according to a plurality of contour detection results to form the final nail contour. Therefore, comparing to the case where the detecting is carried out according to one detection result, more accurate contour detection can be expected.

Moreover, in the embodiment, the case where one nail contour (combined nail contour Tm) is finally obtained on the basis of two contour detection results which are the first nail contour Ta and the second nail contour Td is shown as an example. However, it is sufficient that there are a plurality of contour detection results to obtain one nail contour at the end and for example, the alignment process and the merging process can be carried out on the bases of three or more contour detection results by obtaining a plurality of the first nail contours Ta and the second nail contours Td.

Further, in the embodiment, the case where a single body of the nail contour detecting device 1 includes all of the functions is shown as an example. However, it is not necessary that a single body of the nail contour detecting device 1 includes all of the functions.

For example, the nail contour detecting device 1 can cooperate with an external terminal device such as a smartphone or the like and the operation for manually cutting out the contour of the nail Tp (the first nail contour Ta) in the first nail image can be carried out in the touch panel of the external terminal device.

In such case, the configuration of the nail contour detecting device can be simplified and the manual contour detection can be carried out in a large-size screen of a personal computer, a tablet terminal or the like. Therefore, the operation can be carried out easily.

In the embodiment, the nails of the fingers and the nails of the toes are to be included in the nail T of the finger U1.

Although a number of embodiments according to the present invention are described above, the scope of the present invention is not limited to the above described embodiments and includes the scope described in the claims and the equivalents thereof.

What is claimed is:

1. A nail contour detecting device comprising:
a processor,
wherein:
the processor obtains first feature point data of a first nail contour which is a nail contour detected from a first nail image obtained by imaging a nail of a finger or a toe, and second feature point data of a second nail contour which is a nail contour detected from a second nail image obtained by imaging a nail of the same finger or toe as the first nail image;
the processor obtains one nail contour based on the first feature point data and the second feature point data; and
the processer adopts feature point data having a greater reliability to obtain the one nail contour in a case where either of the first feature point data and the second feature point data has a reliability that is equal to or greater than a threshold.

2. The nail contour detecting device of claim 1, wherein the first nail contour and the second nail contour are detected in the first nail image and the second nail image respectively by different methods.

3. The nail contour detecting device of claim 1, wherein the first nail contour is obtained by a user manually detecting the nail contour in the first nail image.

4. The nail contour detecting device of claim 1, further comprising a memory that stores, in advance, a reliability map which shows a reliability of each feature point data forming the nail contour, wherein the processer carries out contour detection of the nail reflecting the reliability of feature point data which forms the nail contour by referring to the reliability map.

5. A nail contour detecting method, comprising:
obtaining, by a processor, a first nail image imaging a nail;
obtaining, by the processor, a second nail image imaging a nail of a same finger or toe as the first nail image;
obtaining, by the processor, first feature point data of a first nail contour which is a nail contour detected from the first nail image imaging the nail of a finger or a toe, and second feature point data of a second nail contour which is a nail contour detected from the second nail image obtained by imaging the nail of the same finger or toe as the first nail image; and
obtaining, by the processor, one nail contour based on the first feature point data and the second feature point data; and
wherein feature point data having a greater reliability is adopted to obtain the one nail contour in a case where either of the first feature point data and the second feature point data has a reliability that is equal to or greater than a threshold.

6. A non-transitory readable storage medium storing a program that is executable by a computer of a nail contour detecting device to control the computer to realize functions comprising:
obtaining a first nail image imaging a nail;
obtaining a second nail image imaging a nail of a same finger or toe as the first nail image;
obtaining first feature point data of a first nail contour which is a nail contour detected from the first nail image imaging the nail of a finger or a toe, and second feature point data of a second nail contour which is a nail contour detected from the second nail image obtained by imaging the nail of the same finger or toe as the first nail image; and
obtaining one nail contour based on the first feature point data and the second feature point data,
wherein feature point data having a greater reliability is adopted to obtain the one nail contour in a case where either of the first feature point data and the second feature point data has a reliability that is equal to or greater than a threshold.

7. A nail contour detecting device comprising:
a processor,
wherein:
the processor obtains first feature point data of a first nail contour which is a nail contour detected from a first nail image obtained by imaging a nail of a finger or a toe, and second feature point data of a second nail contour which is a nail contour detected from a second nail image obtained by imaging a nail of the same finger or toe as the first nail image; and
the processor obtains one nail contour by carrying out alignment of the first nail contour and the second nail contour based on a reliability of the first feature point data and the second feature point data and adopting feature point data having a greater reliability among the first feature point data and the second feature point data.

8. The nail contour detecting device of claim 7, wherein the first nail contour and the second nail contour are detected in the first nail image and the second nail image respectively by different methods.

9. The nail contour detecting device of claim 7, wherein the first nail contour is obtained by a user manually detecting the nail contour in the first nail image.

10. The nail contour detecting device of claim 7, further comprising a memory that stores, in advance, a reliability map which shows a reliability of each feature point data forming the nail contour, wherein the processer carries out contour detection of the nail reflecting the reliability of feature point data which forms the nail contour by referring to the reliability map.

11. A nail contour detecting device comprising a processor,
wherein:
the processor obtains first feature point data of a first nail contour which is a nail contour detected from a first nail image obtained by imaging a nail of a finger or a toe, and second feature point data of a second nail contour which is a nail contour detected from a second nail image obtained by imaging a nail of the same finger or toe as the first nail image;
the processor obtains one nail contour based on the first feature point data and the second feature point data;
the processer adopts the second feature point data to obtain the one nail contour in a case where a reliability of the first feature point data and a reliability of the second feature point data are both equal to or greater than a threshold.

12. The nail contour detecting device of claim 11, wherein the first nail contour and the second nail contour are detected in the first nail image and the second nail image respectively by different methods.

13. The nail contour detecting device of claim 11, wherein the first nail contour is obtained by a user manually detecting the nail contour in the first nail image.

14. The nail contour detecting device of claim 11, further comprising a memory that stores, in advance, a reliability map which shows a reliability of each feature point data forming the nail contour, wherein the processer carries out contour detection of the nail reflecting the reliability of feature point data which forms the nail contour by referring to the reliability map.

* * * * *